(12) United States Patent
Munzinger et al.

(10) Patent No.: US 11,535,307 B2
(45) Date of Patent: Dec. 27, 2022

(54) REINFORCING ELEMENT, SYSTEM OF A REINFORCED STRUCTURAL ELEMENT AND METHOD FOR REINFORCING A STRUCTURAL ELEMENT

(71) Applicant: SIKA TECHNOLOGY AG, Baar (CH)

(72) Inventors: Noah Munzinger, Zürich (CH); Denis Souvay, Illkirch-Graffenstaden (FR); Urs Rheinegger, Regensdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 384 days.

(21) Appl. No.: 16/620,335

(22) PCT Filed: Jun. 21, 2018

(86) PCT No.: PCT/EP2018/066620
§ 371 (c)(1),
(2) Date: Feb. 13, 2020

(87) PCT Pub. No.: WO2018/234475
PCT Pub. Date: Dec. 27, 2018

(65) Prior Publication Data
US 2020/0361544 A1  Nov. 19, 2020

(30) Foreign Application Priority Data
Jun. 22, 2017 (EP) ..................... 17177306

(51) Int. Cl.
*B60J 7/00* (2006.01)
*B62D 27/02* (2006.01)
*B62D 25/00* (2006.01)

(52) U.S. Cl.
CPC ........... *B62D 27/026* (2013.01); *B62D 25/00* (2013.01)

(58) Field of Classification Search
CPC ... H04L 5/0053; H04L 5/0007; H04L 9/3247; H04W 72/042; H04W 72/0413;
(Continued)

(56) References Cited

U.S. PATENT DOCUMENTS 5,755,486 A * 5/1998 Wycech .................. B29C 70/78
296/187.02
6,058,673 A * 5/2000 Wycech .................. B29C 44/18
296/187.02

(Continued)

FOREIGN PATENT DOCUMENTS

EP   1 930 231 A1   6/2008
EP   2 159 136 A1   3/2010
(Continued)

OTHER PUBLICATIONS

Sep. 24, 2018 International Search Report issued in International Patent Application No. PCT/EP2018/066620.
(Continued)

*Primary Examiner* — Kiran B Patel
(74) *Attorney, Agent, or Firm* — Oliff PLC (57) ABSTRACT

A reinforcing element for reinforcing structural elements including at least one channel on an outer side. The outer side forms a shoulder next to the channel. Furthermore, the reinforcing element is provided for forming an open system in terms of an adhesion of the reinforcing element in the structural element, wherein, in a use state of the reinforcing element in the structural element, a space is formed between the shoulder of the reinforcing element and the structural element, which is open relative to an adjacent cavity of the structural element.

9 Claims, 6 Drawing Sheets

(58) Field of Classification Search
CPC .............. A61P 35/00; C08J 2321/00; H01L 2224/32225; Y02T 10/12; C08F 2/38
See application file for complete search history.

(56) References Cited

U.S. PATENT DOCUMENTS

| | | | | |
|---|---|---|---|---|
| 6,079,180 | A * | 6/2000 | Wycech | B62D 29/002 296/187.02 |
| 6,276,105 | B1 * | 8/2001 | Wycech | B60R 19/18 52/843 |
| 6,378,933 | B1 * | 4/2002 | Schoen | B62D 29/002 296/203.02 |
| 6,467,834 | B1 * | 10/2002 | Barz | B62D 29/002 296/203.02 |
| 6,786,533 | B2 * | 9/2004 | Bock | B62D 29/002 296/187.02 |
| 6,793,274 | B2 * | 9/2004 | Riley | B62D 21/152 296/187.03 |
| 6,935,681 | B2 * | 8/2005 | Hasler | B62D 29/002 296/203.02 |
| 6,941,719 | B2 * | 9/2005 | Busseuil | B62D 29/002 296/187.02 |
| 7,077,460 | B2 * | 7/2006 | Czaplicki | B29C 70/745 296/187.02 |
| 7,513,564 | B2 * | 4/2009 | Yamazaki | E04C 3/30 296/187.02 |
| 7,926,867 | B2 * | 4/2011 | Kochert | B62D 29/002 296/203.02 |
| 8,511,743 | B2 * | 8/2013 | Kraushaar | F16S 5/00 296/187.02 |
| 8,530,015 | B2 * | 9/2013 | Mendiboure | B62D 29/002 428/35.8 |
| RE44,796 | E * | 3/2014 | Czaplicki | B29C 70/745 296/187.02 |
| 8,746,780 | B2 * | 6/2014 | Belpaire | B62D 29/002 296/187.02 |
| 8,915,535 | B2 * | 12/2014 | Han | B62D 29/002 296/187.02 |
| 8,998,296 | B2 * | 4/2015 | Eipper | B62D 25/025 296/29 |
| 9,290,211 | B2 * | 3/2016 | Belpaire | B62D 27/026 |
| 9,616,734 | B2 * | 4/2017 | Clark | B60J 5/0402 |
| 9,719,255 | B1 * | 8/2017 | Ehsani | E04C 3/04 |
| 10,597,094 | B2 * | 3/2020 | Meaige | B29C 44/18 |
| 10,933,922 | B2 * | 3/2021 | Belpaire | B62D 29/005 |
| 10,960,929 | B2 * | 3/2021 | Czinger | B22F 7/08 |
| 2001/0042353 | A1 * | 11/2001 | Honda | B29C 44/1228 296/187.02 |
| 2002/0125739 | A1 * | 9/2002 | Czaplicki | B62D 29/002 296/187.02 |
| 2002/0174954 | A1 | 11/2002 | Busseuil et al. | |
| 2004/0046421 | A1 * | 3/2004 | Barz | B62D 29/002 296/187.02 |
| 2004/0104598 | A1 * | 6/2004 | Barz | B62D 25/04 296/187.02 |
| 2004/0222666 | A1 * | 11/2004 | Kropfeld | B62D 29/002 296/187.02 |
| 2008/0217960 | A1 | 9/2008 | Kochert et al. | |
| 2008/0296164 | A1 * | 12/2008 | Dajek | B62D 29/004 296/187.02 |
| 2010/0117397 | A1 * | 5/2010 | Richardson | B32B 3/04 296/187.02 |
| 2010/0280167 | A1 * | 11/2010 | Frick | C08G 59/4253 525/418 |
| 2019/0144041 | A1 * | 5/2019 | Belpaire | B62D 29/008 296/209 |
| 2019/0144047 | A1 * | 5/2019 | Belpaire | B62D 27/026 296/202 |
| 2019/0144050 | A1 * | 5/2019 | Belpaire | B62D 29/002 296/187.01 |
| 2019/0224947 | A1 * | 7/2019 | Munzinger | B32B 27/08 |
| 2020/0130749 | A1 * | 4/2020 | Qian | B62D 25/00 |
| 2020/0298910 | A1 * | 9/2020 | Benouali | B62D 21/02 |

FOREIGN PATENT DOCUMENTS

| | | |
|---|---|---|
| EP | 2 251 250 A1 | 11/2010 |
| GB | 2 375 328 A | 11/2002 |
| WO | 2008/077944 A1 | 7/2008 |

OTHER PUBLICATIONS

Dec. 24, 2019 International Preliminary Report on Patentability issued in International Patent Application No. PCT/EP2018/066620.

\* cited by examiner

Fig. 1

(RELATED ART)

Fig. 6

# REINFORCING ELEMENT, SYSTEM OF A REINFORCED STRUCTURAL ELEMENT AND METHOD FOR REINFORCING A STRUCTURAL ELEMENT

The invention relates to a reinforcing element, to a system of a reinforced structural element, and to a method for reinforcing a structural element. Reinforcing elements in question are more particularly those for use in bodies of vehicles.

Construction elements, such as, for example, bodies and/or frames of transportation and conveyance means, and especially of water or land vehicles or of aircraft, in many instances comprise structures having cavities, so as to enable lightweight constructions. These cavities, however, are a cause of a wide variety of problems. Depending on the nature of the cavity, it must be sealed in order to prevent the ingress of moisture and dirt, which can lead to the corrosion of the construction elements. It is oftentimes also desirable for the cavities and hence the construction element to be substantially reinforced, but for the low weight to be retained. It is often also necessary to stabilize the cavities and hence the construction elements so as to reduce noise, which would otherwise be transmitted along or through the cavity. Many of these cavities are irregular in shape or have a narrow extent, so making it more difficult for them to be correctly sealed, reinforced, and damped.

Particularly in automotive engineering, though also in aviation and nautical construction, therefore, sealing elements (baffles) are used in order for cavities to be sealed and/or acoustically isolated, or reinforcing elements (reinforcers) are used in order for cavities to be reinforced.

Figure 1:
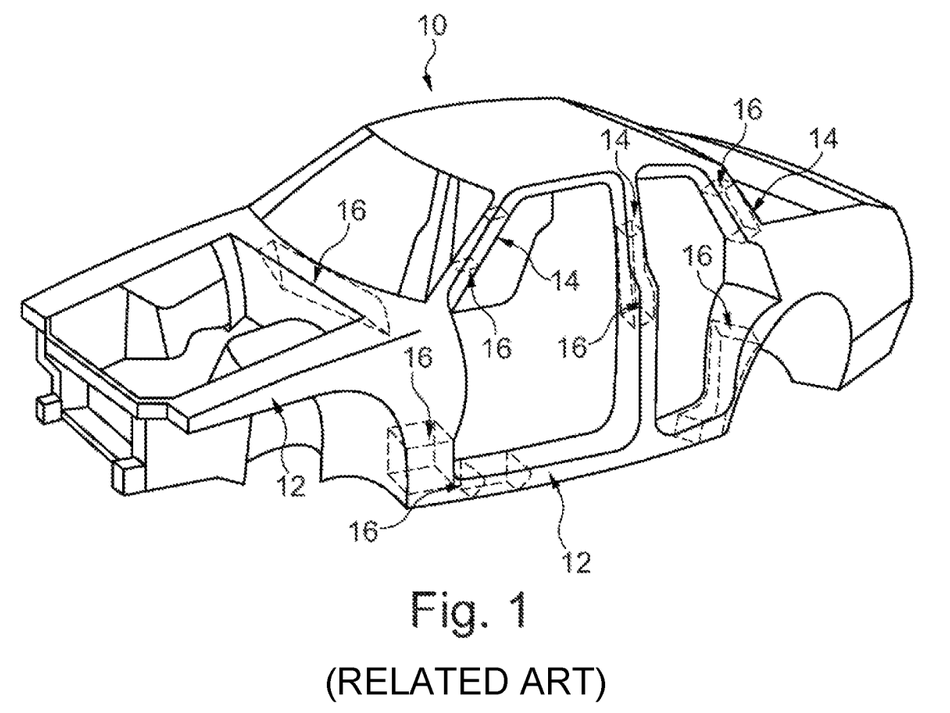
FIG. 1 an exemplary representation of a prior-art vehicle body.

A body of an automobile is represented schematically in FIG. 1. This body 10 comprises various structures having cavities, such as, for example, pillars 14 and supports or stays 12. Structural elements 12, 14 of this kind having cavities are typically sealed and/or reinforced using sealing and/or reinforcing elements 16, respectively.

Figure 2A:
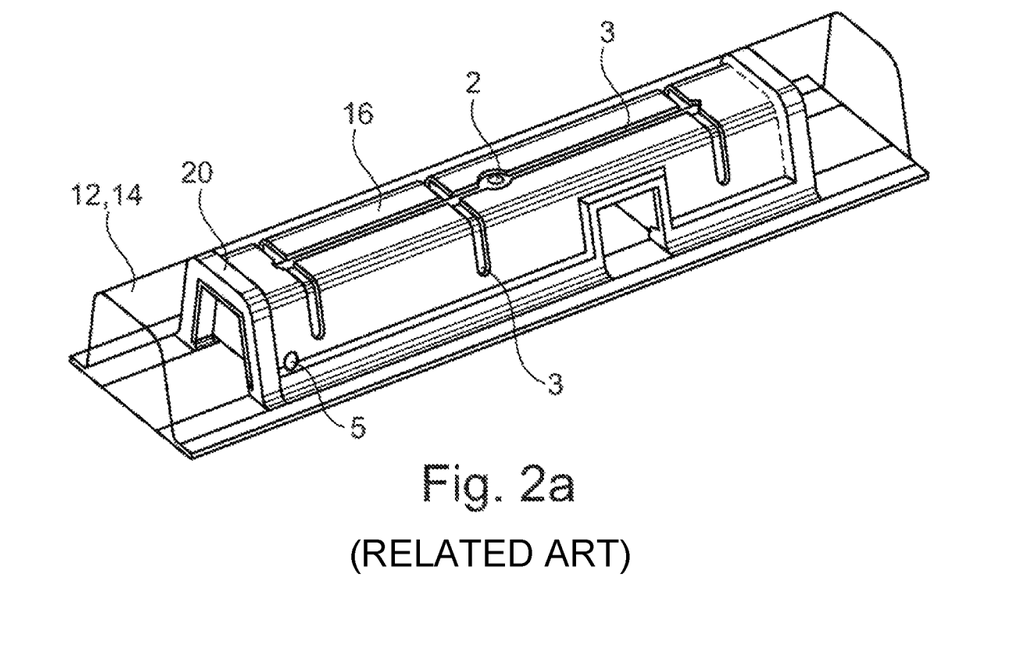
FIGS. 2a and 2b a schematic representation of an exemplary reinforcing element in a prior-art structural element.
Figure 2B:
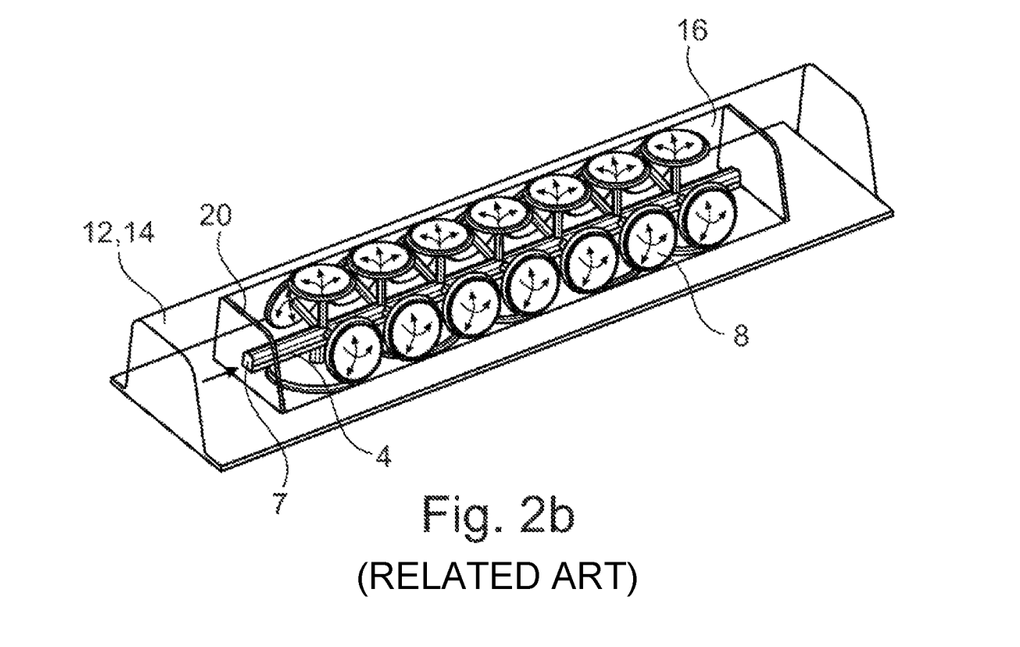

A known system of a reinforced structural element is represented schematically in FIGS. 2a and 2b. This structural element 12, 14 has a cavity in which the reinforcing element 16 is disposed. The systems according to FIGS. 2a and 2b each have arrangements for introducing an adhesive 8 between the reinforcing element 16 and the structural element 12, 14.

In FIG. 2a, this system for introducing an adhesive comprises a filling opening 2, which is provided as a hole in the structural element 12, 14. The system further comprises channels 3, for distributing the adhesive, on an outside of the reinforcing element 16. Moreover, the reinforcing element 16 comprises seals 20, which delimit a closed space between the outside of the reinforcing element 16 and the structural element 12, 14. This closed space is then filled with adhesive via the filling opening 2, the adhesive being distributed efficiently in the space by means of the channels 3. Also provided is an inspection opening 5, by virtue of which it is possible to examine whether the adhesive fills the entire space.

FIG. 2b represents schematically an alternative known system for the filling of an intermediate space between reinforcing element 16 and structural element 12, 14 with adhesive 8. Here, adhesive is supplied via a filling opening 7 on the reinforcing element 16, with the adhesive 8 then being brought, through a system of lines 4 in the reinforcing element 16, into the space between reinforcing element 16 and structural element 12, 14. Here as well, the reinforcing element 16 comprises seals 20 which delimit the space intended for the adhesive 8. A system described with reference to FIGS. 2a and 2b is disclosed, furthermore, in the patent application WO 2008/077944 A1.

A disadvantage of such known reinforcing elements and systems for reinforcing structural elements is that the production of the reinforcing elements is inevitably comparatively complicated and precise. This is necessary in particular because the reinforcing element and the structural element have to define a reliably closed space for introduction of the adhesive. Consequently, both the reinforcing element and the structural element have to be manufactured with small tolerances, which is more costly. Furthermore, such systems require a larger amount of adhesive than actually necessary for the bonding of reinforcing element and structural element, because an entire space between reinforcing element and/or seals thereof and structural element has to be filled with adhesive.

The object on which the invention is based is therefore that of providing an improved reinforcing element and, respectively, system of a reinforced structural element, allowing both the reinforcing element and the system for reinforcing a structural element to be produced more cost-effectively and to be designed in a way which is easier to manage.

This object is first achieved by a reinforcing element for reinforcing structural elements, the reinforcing element having at least one channel on an outside. This outside of the reinforcing element forms a shoulder alongside the channel. Additionally, the reinforcing element is intended to form an open system in respect of adhesive bonding of the reinforcing element in the structural element, wherein, in a state of use of the reinforcing element in the structural element, a space is formed between the shoulder of the reinforcing element and the structural element, said space being open in relation to a bordering cavity of the structural element.

The object stated above is further achieved by a system of a reinforced structural element, the system comprising: a structural element having a cavity; a reinforcing element which is disposed in the cavity of the structural element and which has at least one channel on an outside of the reinforcing element, the outside of the reinforcing element forming a shoulder alongside the channel; and an adhesive, which is disposed at least partly in the channel and at least partly on the shoulder and which bonds the reinforcing element to the structural element, wherein a joining region, directly adjoining the shoulder, of the outside of the reinforcing element is free of adhesive, and wherein a first space between shoulder and structural element and a second space between joining region and structural element are open to one another.

The solution proposed here has the advantage that, for the bonding of the reinforcing element in the structural element, there is no need to provide a space for the adhesive that is closed off in a fluid-tight manner, it being possible instead to use a more cost-effective and easily manageable open system without intermediate spaces that are closed off in a fluid-tight manner. Accordingly it is possible to use reinforcing elements which have no seals, corresponding to a substantial cost advantage.

Furthermore, the present invention allows even parts with relatively large manufacturing tolerances to be bonded to one another, since there is no need to provide spaces for the adhesive that are closed off in a fluid-tight manner. This too corresponds to a substantial cost advantage relative to the known systems, since it allows the various elements of the system to be produced more cost-effectively with larger manufacturing tolerances.

Moreover, the bonding operation is easier to accomplish, since the filling of closed spaces with adhesive is accompanied by difficulties, which can be avoided hereby, particularly the displacement of the air in the closed cavity by the adhesive.

A key concept of the present invention is that through the use of a suitable adhesive, it is possible to use an open system for bonding a reinforcing element in a structural element. It has been observed, indeed, that with a suitable adhesive, it is possible to create a self-sealing system, subject to the provision of a reinforcing element with shoulders and channels that are suitably sized in this regard.

The adhesive here is configured such that when it cools, it exhibits a sharp transition between an unsolidified and a solidified state. This allows components in an open system described here to be bonded with a suitable adhesive of this kind.

The channels here are sized such that the adhesive flowing through the channels cools comparatively slowly. This is achieved in particular by designing a surface of the channels that is comparatively small in comparison to the volume of the channels.

Conversely, in the region between the shoulder and the structural element, the cooling of the adhesive is quicker by comparison. This is achieved in particular by designing a surface in this region that is comparatively larger in comparison to the volume of this region.

An arrangement of this kind leads to quicker solidification of the adhesive on the shoulders than in the channels, and hence to a reliable, self-closing system.

Through a suitable provision of channels on the outside of the structural element, then, it is possible to distribute the adhesive introduced into the channels in the intermediate space between reinforcing element and structural element, and, through the suitable provision of shoulder regions alongside the channels, a system is created which is self-closing.

The designation "open" or "open system" in the context of this invention means "fluid-permeable" or "not sealed".

In one exemplary embodiment, a channel width is between 5 and 300 mm, preferably between 10 and 70 mm, more preferably between 10 and 30 mm.

In one exemplary embodiment, a channel depth is between 0.5 and 10 mm, preferably between 1 and 8 mm, more preferably between 2 and 5 mm.

In one exemplary embodiment, a channel length is between 50 and 500 mm, preferably between 70 and 400 mm, more preferably between 100 and 300 mm.

The advantage of sizing the channel in this way is that the adhesive is consequently cooled so slowly as it flows through the channel that the adhesive is distributed over an entire length of the channel, in order thereto reliably to bond the reinforcing element in the structural element.

Depending on the composition and application parameters (e.g. temperature or extrusion rate) of the adhesive, the sizing of the channel in the stated ranges can be adapted in order to achieve an optimum result. It is desirable here for the adhesive not to cool or solidify completely in the channel until the desired distribution of the adhesive has been achieved in the intermediate space between reinforcing element and structural element.

In one exemplary embodiment, the channel has a V-shaped or a U-shaped or an angular or a semicircular form.

A suitable cross-sectional form to the channel can be selected according to the rate at which the adhesive is to flow through the channel and/or the rate at which the adhesive is intended to cool in the channel and so solidify. In principle, the greater the contact surface area between adhesive and reinforcing element, the quicker the cooling of the adhesive. In a semicircular form, accordingly, the adhesive will cool more slowly than in a rectangular cross-sectional form.

In one exemplary embodiment, the channel has a substantially W-shaped cross section. In this case, in particular, a base of the channel has an elevation. An elevation of this kind may be rounded, undulating, angular, or irregular in form.

A substantially W-shaped cross section of the channel of this kind has the advantage that it allows the amount of adhesive required to be reduced in comparison to channels without such an elevation in the base of the channel.

The channel may have a constant cross section; in an alternative exemplary embodiment, however, the channel may also have a nonconstant cross section. In that case the length, the width, and the depth of the channel may be of nonconstant configuration. Accordingly it is also possible, for example, to realize channels which are less deep at ends than in a middle of the channel (under a filling opening, for example), or channels which exhibit an oval shaping in plan view.

Of course, the channel need not run linearly over its entire length, but instead may also be curved or implemented with diverse changes in direction.

In general the channel serves for basic distribution of the adhesive in the intermediate region, provided for bonding, between reinforcing element and structural element. The channel geometry may therefore advantageously differ according to what the particular application requires.

In one exemplary embodiment, the channel runs transversely or substantially transversely to a longitudinal direction of the reinforcing element.

In one alternative embodiment, the channel runs longitudinally or substantially longitudinally to a longitudinal direction of the reinforcing element.

In a further exemplary embodiment, the channel runs completely around the reinforcing element and hence is self-contained.

In a further exemplary embodiment, the channel has branches.

In a further exemplary embodiment, the channel comprises a main channel and side channels connected thereto.

The arrangement and design of the channel or channels on the outside of the reinforcing element are dependent on the positions at which the reinforcing element is to be bonded to the structural element. For this purpose, channels which go completely around the reinforcing element may be provided; a plurality of channels designed separate from one another may be provided; or else channels with branches and/or side channels may be provided. In particular it is possible to use side channels to increase the bonding area between reinforcing element and structural element.

In one exemplary embodiment, a width of the shoulder, measured in the same direction as the channel width, is less than 30 mm, preferably less than 20 mm, more preferably less than 10 mm, more preferably less than 5 mm.

An advantage of providing a shoulder with such sizing is that it allows the structural element to be bonded to the reinforcing element in a manner which requires a small amount of adhesive. Moreover, it results in a greater freedom of design of the reinforcing element, because the regions outside the shoulder are not intended for the bonding of the reinforcing element to the structural element and therefore need not have any predefined shaping.

In one alternative embodiment, a width of the shoulder, measured in the same direction as the channel width, is between 30 and 150 mm, preferably between 40 and 120 mm, more preferably between 50 and 100 mm.

An advantage of providing a shoulder with such sizing, conversely, is that it allows the structural element to be bonded to the reinforcing element in a manner which exhibits a larger bonding area, leading to a mechanically more stable connection between structural element and reinforcing element.

A suitable width of the shoulder may be selected, accordingly, in line with the requirement and initial situation. In order to ensure the halting of the spread of the adhesive on the shoulder, the solidification behavior of the adhesive may be influenced by a corresponding adaptation to the adhesive composition, for example, or it may be influenced by an altered temperature of adhesive on introduction of the adhesive into the channel, or it may be influenced by an adaptation to the spacing between shoulder and structural element.

In one exemplary embodiment, a width of the joining region, measured in the same direction as the channel width, is more than 1 mm, preferably more than 20 mm, more preferably more than 30 mm, more preferably more than 40 mm.

In one exemplary embodiment, the shoulder and the joining region lie in the same plane.

In an alternative embodiment, the shoulder and the joining region do not lie in the same plane.

Because the joining region is not covered with adhesive, it is immaterial for bonding as to how this joining region is designed. All that is essential is that the space which is formed between the shoulder of the reinforcing element and the structural element is open in relation to the bordering cavity of the structural element.

The joining region of the reinforcing element may be suitably configured according to the geometry of the structural element and/or of its cavity.

In one exemplary embodiment, a spacing between shoulder and structural element is between 0.5 and 5 mm, preferably between 0.8 and 4 mm, more preferably between 1 mm and 3 mm.

A spacing of such size between shoulder and structural element ensures that the adhesive cools more quickly in this region of the cavity between structural element and reinforcing element, and so solidifies more quickly, than in the region of the channels, with the consequence that the adhesive is distributed through the channels between structural element and reinforcing element, but cools and solidifies in the regions of the shoulders and so seals the channels from the cavity of the structural element.

The spacing between shoulder and structural element may be selected differently according to the composition and application parameters of the adhesive, in order to achieve the desired sealing effect of the adhesive in this region. This spacing between shoulder and structural element may also be utilized for influencing a bonding area between reinforcing element and structural element; a larger spacing will lead to a larger bonding area, and a smaller spacing to a smaller bonding area.

In one preferred embodiment, the reinforcing element or the structural element has a filling opening for introducing the adhesive into the channel.

The advantage of a filling opening of this kind is that the adhesive can be introduced directly into the channel.

In one preferred development, the filling opening opens directly into the channel. The filling opening here may be disposed centrally in relation to a length and/or width of the channel.

Furthermore, the filling opening may be disposed in the reinforcing element which also comprises the channel, or else the filling opening may be disposed in the structural element. In principle, the arrangement of the filling opening is dependent on how the elements are accessible in a state of use (particularly in a situation in which the adhesive is to be introduced).

In one exemplary embodiment, the reinforcing element has at least one element for fixing the reinforcing element in the structural element. In one preferred embodiment, this element is configured as a clip.

In a further exemplary embodiment, the reinforcing element has at least one element for supporting the reinforcing element in the structural element. In one preferred embodiment, this element is configured as a projection in the structural element.

Elements of this kind for fixing and supporting the reinforcing element in the structural element have the advantage that the reinforcing element remains at an intended position in the structural element before the adhesive has solidified and/or cured.

The object stated above is further achieved by a method for reinforcing a structural element, the method comprising the steps of: providing a structural element having a cavity; disposing a reinforcing element in the cavity of the structural element, the reinforcing element having at least one channel on an outside of the reinforcing element, the outside of the reinforcing element forming a shoulder alongside the channel; introducing an adhesive into the channel; and spreading the adhesive at least partly in the channel and at least partly on the shoulder for bonding the reinforcing element to the structural element, wherein the spreading of the adhesive is stopped on the shoulder.

The method offers the advantage, in turn, that it enables the provision of an open system for bonding a reinforcing element to a structural element, the system being able to be produced more cost-effectively and managed more easily than closed systems with seals.

In one exemplary embodiment, the spreading of the adhesive on the shoulder is stopped by solidification of the adhesive on the shoulder.

In one exemplary embodiment, the method comprises the following step: curing the adhesive by application of a temperature of at least 120° C., preferably of at least 140° C., more preferably of at least 160° C.

The adhesive may be cured, for example, in an oven, of the kind commonly employed after the cathodic deposition coating (CDC) of the body. The temperatures prevailing in such ovens are typically between 120° C. and 220° C. Such temperatures are especially suitable for the curing of adhesives which can be used in connection with this invention. Because the body with the reinforcing element disposed therein and with the solidified adhesive is to pass in any case through the operation of deposition coating and subsequent application of heat to cure the paint system, the utilization of this application of heat in the oven after the deposition coating, for the purpose of curing the adhesive, is particularly advantageous.

In one exemplary embodiment, the adhesive on introduction into the channel is conveyed by a pump from an adhesive tank.

In one exemplary embodiment, the adhesive on introduction into the channel is conveyed through a filling opening in the structural element.

The provision of a filling opening in the structural element has the advantage that the reinforcing element can be designed more cost-effectively, since with this embodiment there is no need to provide filling openings and lines in the reinforcing element.

In an alternative exemplary embodiment, the adhesive on introduction into the channel is conveyed through a filling opening and a line in the reinforcing element.

The provision of a filling opening and of lines in the reinforcing element has the advantage that no openings at all need be provided in the structural element for introducing the adhesive.

Depending on the sphere of application and the requirements, it is possible here to select one or the other mode of filling the intermediate space between reinforcing element and structural element with adhesive.

The reinforcing element may consist of any desired materials. Preferred materials are plastics, especially polyurethanes, polyamides, polyesters, and polyolefins, preferably polymers which are stable at high temperature such as poly(phenylene ethers), polysulfones or polyethersulfones, which in particular may also have been foamed; metals, especially aluminum and steel; or grown organic materials, especially wood-based or other (pressed) fiber materials, or vitreous or ceramic materials; including, especially, foamed materials of this kind; or any desired combinations of these materials. Particular preference is given to using polyamide, especially polyamide 6, polyamide 6,6, polyamide 11, polyamide 12, or a mixture thereof. Combinations with fibers are possible as well, such as glass fibers or carbon fibers, for example.

Furthermore, the reinforcing element may have any desired construction and any desired structure. It may, for example, be solid, hollow, or foamed, or have a gridlike structure. The surface of the reinforcing element may customarily be smooth, rough or textured.

Adhesive

The adhesive composition described below is an exemplary adhesive, as may be used in the context of this invention.

A thermosetting one-component epoxy composition in accordance with table 1 was prepared.

TABLE 1 raw materials used.

| Raw materials | Parts by weight |
| --- | --- |
| Liquid epoxy resin, D.E.R. 331 (bisphenol A diglycidyl ether), Dow | 50 |
| Polyester polyol, Dynacol 7380, Degussa AG, Germany | 5 |
| Reactive diluent, hexanediol glycidyl ether, Denacol EX-212, Nagase America | 1 |
| Toughness improver D-1 | 34 |
| Curing agent, dicyandiamide | 4.78 |
| Accelerator, substituted urea | 0.22 |
| Fumed silica | 5 |

Preparation of a Toughness Improver ("D-1")

150 g of Poly-THF 2000 (OH number 57 mg/g KOH) and 150 g of Liquiflex H (OH number 46 mg/g KOH) were dried at 105° C. under reduced pressure for 30 minutes. Following reduction of the temperature to 90° C., 61.5 g of IPDI and 0.14 g of dibutyltin dilaurate were added. The reaction was carried out under reduced pressure at 90° C. until the NCO content was constant at 3.10% after 2.0 h (calculated NCO content: 3.15%). Then 96.1 g of Cardanol were added as a blocking agent. Stirring was continued under reduced pressure at 105° C. until free NCO was no longer detectable. The product was used in this form as toughness improver D-1. Raw materials employed for this purpose were as follows:

Poly-THF 2000 (difunctional polybutylene glycol)
(OH equivalent weight = around 1000 g/OH equivalent), BASF
Liquiflex H (hydroxyl-terminated polybutadiene)
(OH equivalent weight = around 1230 g/OH equivalent), Krahn
Isophorone diisocyanate (= "IPDI"), Evonik
Cardolite NC-700 (Cardanol, meta-substituted alkenyl-mono-phenol), Cardolite Production of Masterbatch The polyester polyol was mixed at about 40° C. above its softening point of 77° C. (around 100-140° C.) for around 30 minutes with liquid epoxy resin until a clear mixture (around 33 wt % of polyester polyol based on the total weight of the masterbatch) was formed. The masterbatch was subsequently cooled down to around 100° C.

Preparation of the Thermosetting One-Component Epoxy Composition:

The rest of the components of the epoxy composition were mixed to a homogeneous material, preferably at temperatures of around 50-90° C. As soon as the mixture was homogeneous, the masterbatch in liquid form (masterbatch temperature 100° C.) was added, with immediate mixing carried out.

The thermosetting one-component epoxy composition was injected at a temperature of 60° C. and at an injection rate of 50 ml/min.

Details and advantages of the invention are described below using exemplary embodiments and with reference to schematic drawings. The following are shown.

Figure 3A:
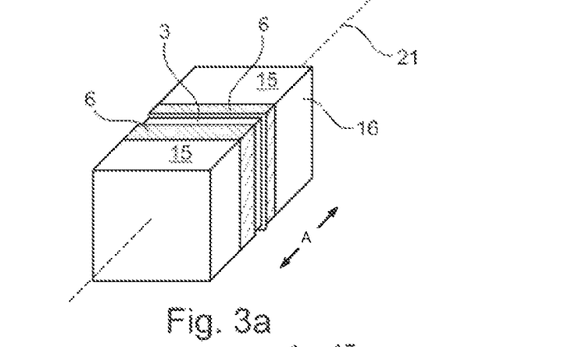
FIGS. 3a to 3c schematic representation of an exemplary reinforcing element.
Figure 3B:
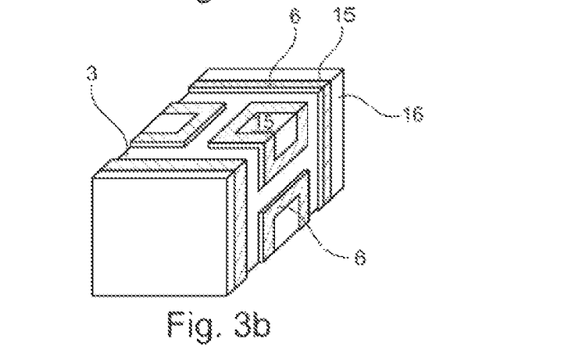
Figure 3C:
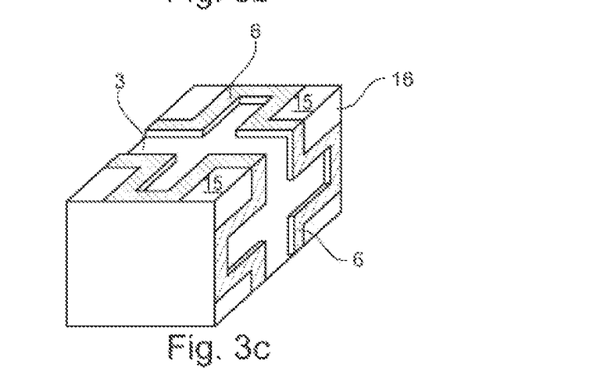

FIGS. 3a to 3c represent various embodiments of an exemplary reinforcing element 16. Each such reinforcing element 16 has a longitudinal axis 21. At least one channel 3 is disposed on an outside of the reinforcing element 16. Moreover, the reinforcing element 16 in each case has a shoulder 6 alongside the channel 3, with a joining region 15 disposed directly bordering the shoulder 6. The shoulder 6 and the joining region 15 may lie in the same plane A, as shown in FIG. 3a.

The exemplary reinforcing element in FIG. 3a has a channel 3 which goes completely around the reinforcing element 16 and which is self-contained. In this exemplary embodiment, moreover, the channel 3 is disposed transversely to the longitudinal axis 21 of the reinforcing element 16.

In the exemplary embodiment according to FIG. 3b, the reinforcing element has two channels 3, each of which go completely around the reinforcing element 16. Moreover, the two circulating channels 3 are connected to one another by side channels.

The exemplary embodiment of a reinforcing element 16 represented in FIG. 3c likewise has a channel 3 which goes completely around the reinforcing element 16. In contrast to the exemplary embodiment in FIG. 3a, the circulating channel 3 in the exemplary embodiment according to FIG. 3c additionally has side channels on each longitudinal side of the reinforcing element 16, in order to be able to distribute the adhesive more widely on the reinforcing element 16.

FIGS. 4a to 4d represent various embodiments of filling openings 2 and channels 3 of an open system 100. These figures show in each case a detail from a cross section through a structural element 12, 14 and a reinforcing element 16 disposed therein.

Figure 4A:
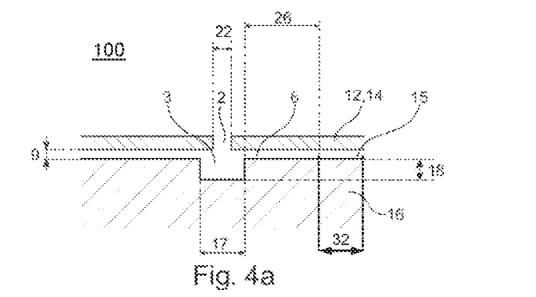
FIGS. 4a to 4d schematic representation of a cross section of an exemplary reinforcing element in a structural element.

In FIG. 4a, the channel 3 is configured with a rectangular cross section. In this exemplary embodiment, the filling opening 2 is disposed in the structural element 12, 14 for filling the channel 3 with adhesive.

The drawing in FIG. 4a, moreover, shows the directions along which measurements are made in each case of a channel width 17, a channel depth 18, a filling opening 2 diameter 22, a spacing 9 between shoulder 6 and structural element 12, 14, and a shoulder width 26.

In this case the shoulder 6 is configured directly adjoining the channel 3, and the joining region 15 having a width 32 is in turn configured directly adjoining the shoulder 6.

Figure 4B:
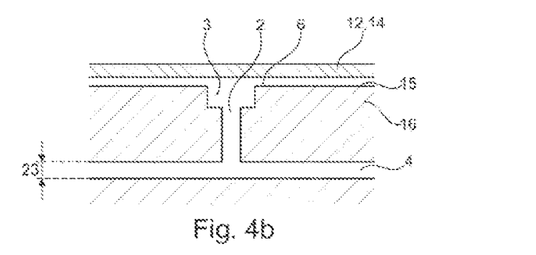

FIG. 4b represents a further embodiment in relation to the filling opening 2 and the channel 3. In this exemplary embodiment, and in contradistinction to the exemplary embodiment in FIG. 4a, the filling opening 2 is provided in the channel 3. In this case a line 4 leads through an interior of the reinforcing element 16 and to the filling opening 2, in order to guide the adhesive (not shown) from a filling opening in the reinforcing element (not shown) into the channel 3. This line 4 has a diameter 23. Again, the channel 3 is configured with a rectangular cross section. Disposed directly adjoining the channel 3 is the shoulder 6, and disposed adjoining the shoulder 6 is the joining region 15.

Figure 4C:
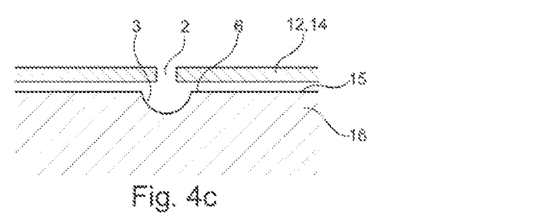
Figure 4D:
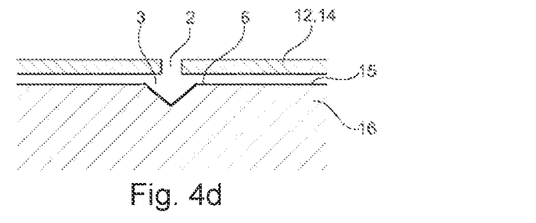

FIGS. 4c and 4d represent further exemplary embodiments. The channel 3 in FIG. 4c has a semicircular or U-shaped cross section. The channel 3 in FIG. 4d has an angular or V-shaped cross section. In these exemplary embodiments, moreover, there is again a filling opening 2 disposed in the structural element 12, 14, for the filling of the channel 3 with adhesive.

Figure 5A:
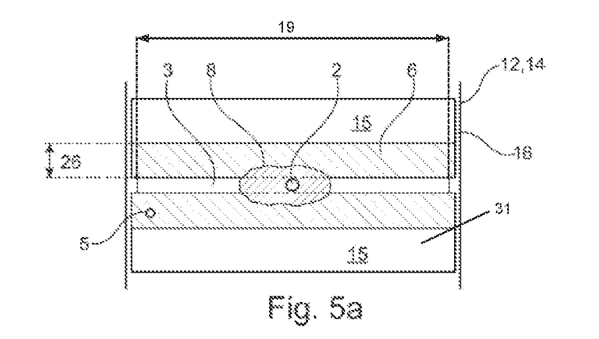
FIGS. 5a to 5c schematic representation of an exemplary introduction of an adhesive into the intermediate space between reinforcing element and structural element.
Figure 5B:
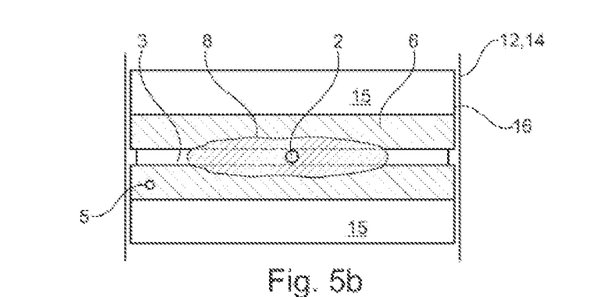
Figure 5C:
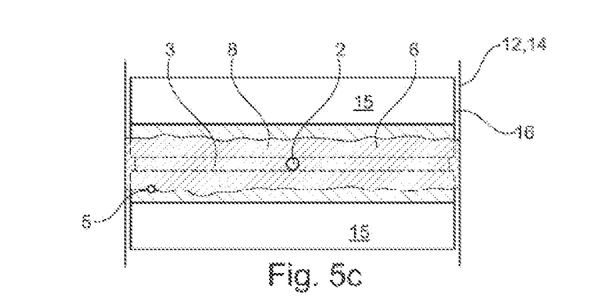

FIGS. 5a to 5c represent an exemplary process of introducing the adhesive 8 into an intermediate space between reinforcing element 16 and structural element 12, 14 having a cavity 31. FIG. 5a shows a situation shortly after commencement of the introduction with adhesive 8. The drawing in FIG. 5a, moreover, shows the direction along which measurement is made in a channel length 19. FIG. 5b shows a situation in which the adhesive 8, which has already been introduced, is spreading primarily along the channel 3, and in which at the same time new adhesive 8 is being continually introduced. FIG. 5c, finally, shows a situation in which the adhesive 8 has all been introduced into the intermediate space, and the reinforcing element 16 is bonded in the manner envisaged to the structural element 12, 14.

The adhesive 8 is introduced into the channel 3 through a filling opening 2. The liquid adhesive 8 spreads primarily in the direction of the channel 3 and flows at least partly onto the shoulder 6 of the reinforcing element 16. Because the spacing between shoulder 6 and structural element 12, 14 is smaller than the spacing between a base of the channel 3 and the structural element 12, 14, the adhesive 8 in the region of the shoulder 6 cools quicker than in the region of the channel 3, and, as a consequence of this cooling, solidifies in the region of the shoulder 6. This results in a self-sealing function of the adhesive 8 in the region of the shoulder 6. The system here is configured such that the adhesive 8 does not flow over the region of the shoulder 6, and so the joining region 15 remains free of adhesive 8.

In this exemplary embodiment, moreover, an inspection opening 5 is provided, which allows examination of the progress of the spreading of the adhesive 8 in the intermediate region between reinforcing element 16 and structural element 12, 14.

In FIGS. 5a and 5b, the adhesive 8 has not yet spread to the inspection opening 5. FIG. 5c, in contrast, shows a situation in which the adhesive 8 fills the intermediate space between reinforcing element 16 and structural element 12, 14 in the intended way, and reaches the inspection opening 5.

Figure 6:
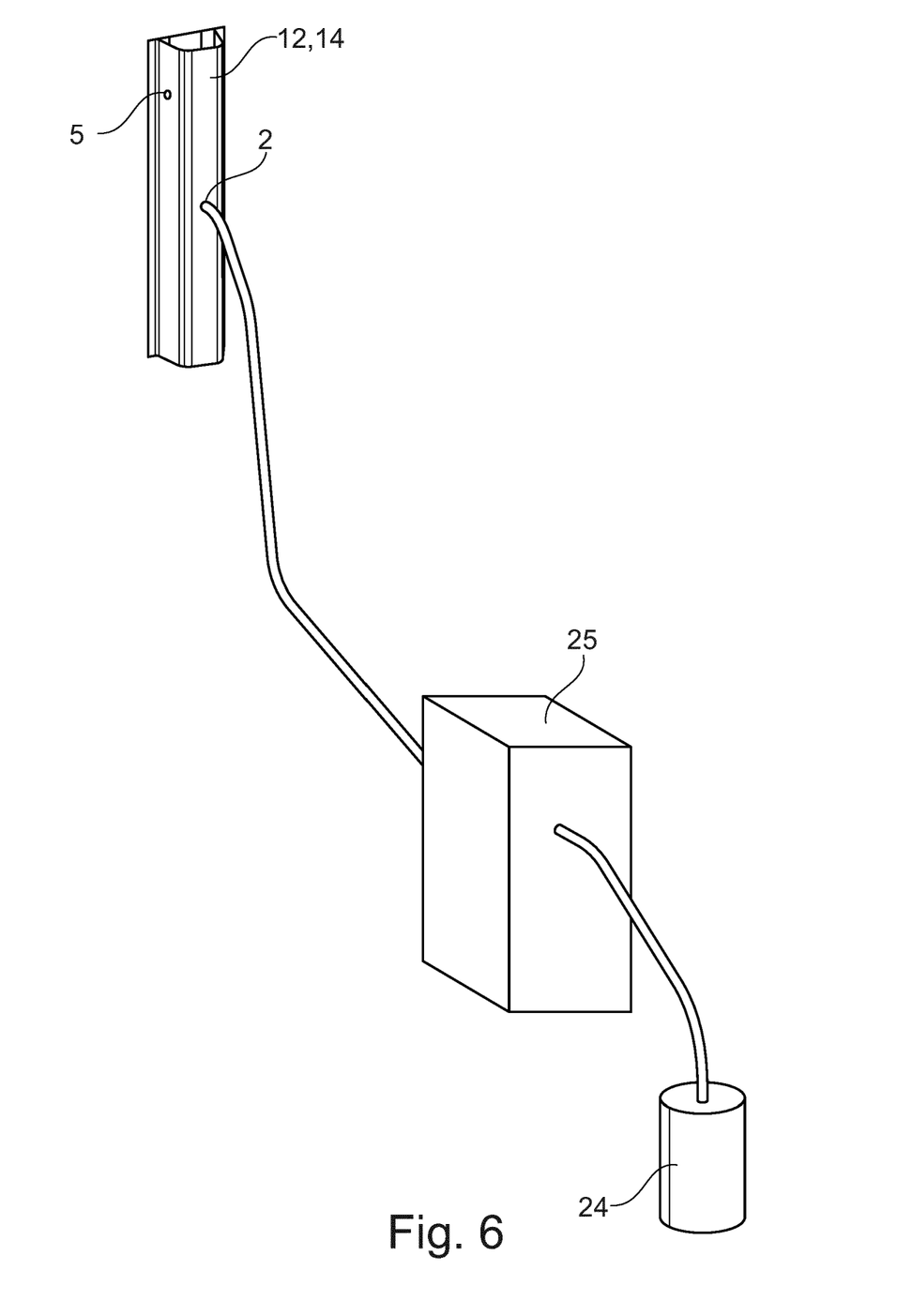
FIG. 6 a schematic representation of an introduction facility.

FIG. 6 represents a facility for introducing the adhesive into the intermediate region between structural element 12, 14 and reinforcing element (not visible in this representation). Here, a pump 25 conveys adhesive from an adhesive tank 24 through a filling opening 2 in the structural element 12, 14 into the intermediate region between structural element and reinforcing element. To verify the progress of distribution of the adhesive in this intermediate region, an inspection opening 5 is provided in the structural element 12, 14.

The invention claimed is:

1. A reinforcing element for reinforcing structural elements, the reinforcing element having at least one channel on an outside, the outside of the reinforcing element forming, alongside the channel, a shoulder,
   wherein the reinforcing element is configured to be disposed in the structural element and form an open system with the structural element during adhesive bonding, and form a space between the shoulder of the reinforcing element and the structural element, the space being open in relation to a bordering cavity of the structural element.

2. The reinforcing element as claimed in claim 1, wherein at least one of a width of the channel is between 5 and 300 mm, a depth of the channel is between 0.5 and 10 mm, and a length of the channel is between 50 and 500 mm.

3. The reinforcing element as claimed in claim 1, wherein a cross section of the channel has a V-shaped, U-shaped, angular, or a semicircular form.

4. The reinforcing element as claimed in claim 1, wherein the channel runs transversely to a longitudinal axis of the reinforcing element.

5. The reinforcing element as claimed in claim 1, wherein the channel runs completely around the reinforcing element.

6. The reinforcing element as claimed in claim 1, wherein the channel has branches and/or
   wherein the channel has a main channel and side channels connected thereto.

7. The reinforcing element as claimed in claim 1, wherein a width of the shoulder, measured in the same direction as a width of the channel, is less than 30 mm.

8. The reinforcing element as claimed in claim 1, wherein a width of the joining region, measured in the same direction as a width of the channel, is more than 1 mm.

9. The reinforcing element as claimed in claim 1, wherein the shoulder and the joining region lie in a same plane.

* * * * *